Dec. 2, 1969     R. K. GARDNER, SR     3,481,358
FAIL-SAFE VALVE SYSTEM
Filed April 14, 1967     5 Sheets-Sheet 1
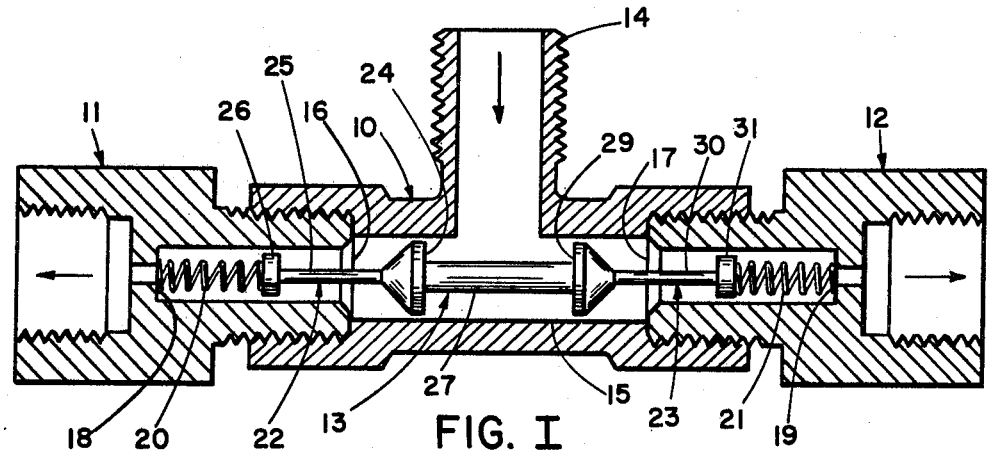
FIG. I
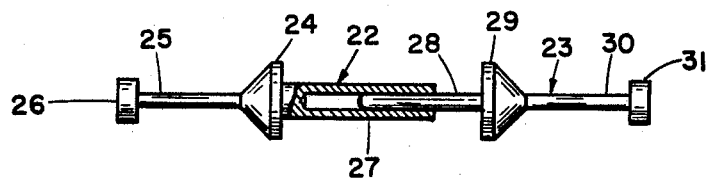
FIG. II
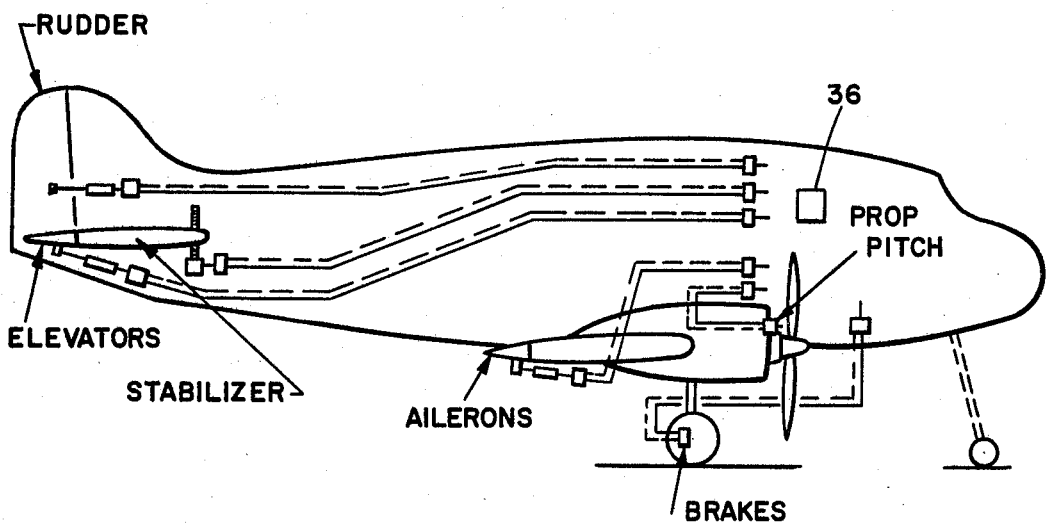
FIG. VII
*INVENTOR.*
ROBERT K. GARDNER, SR.
BY
*Lawrence H. Poston*
AGENT Dec. 2, 1969   R. K. GARDNER, SR   3,481,358
FAIL-SAFE VALVE SYSTEM
Filed April 14, 1967   5 Sheets-Sheet 2
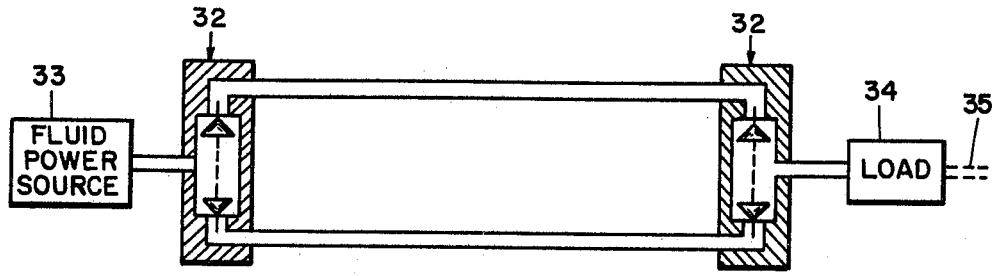
FIG. III
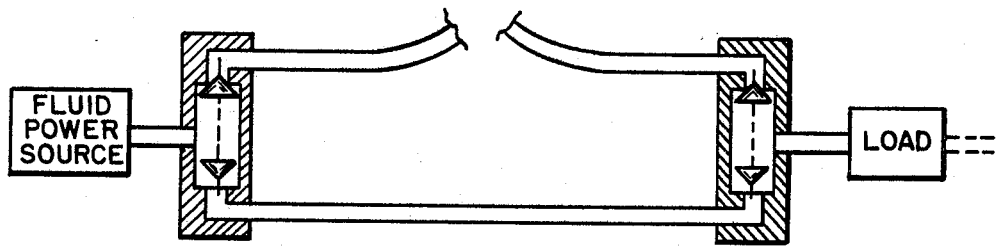
FIG. IV
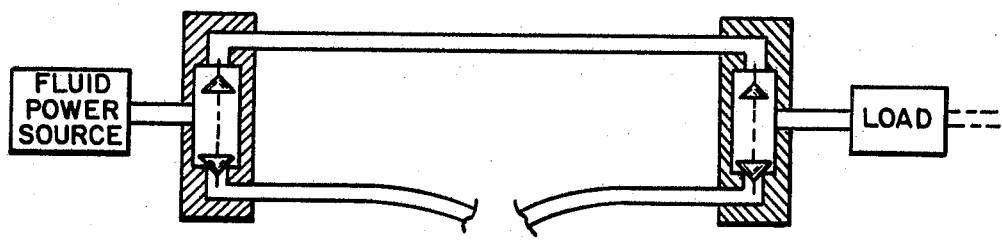
FIG. V
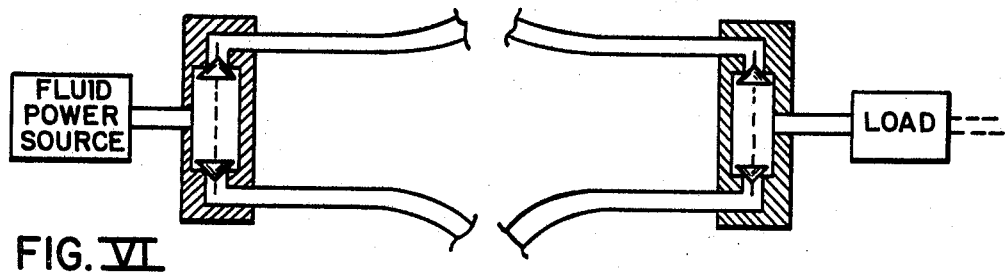
FIG. VI
INVENTOR.
ROBERT K. GARDNER, SR.
BY
Lawrence H. Poeton
AGENT Dec. 2, 1969   R. K. GARDNER, SR   3,481,358
FAIL-SAFE VALVE SYSTEM
Filed April 14, 1967   5 Sheets-Sheet 3
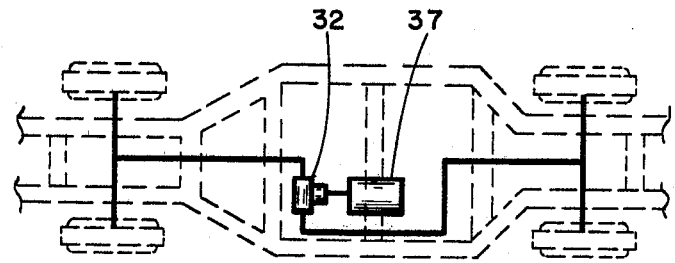
FIG. VIII
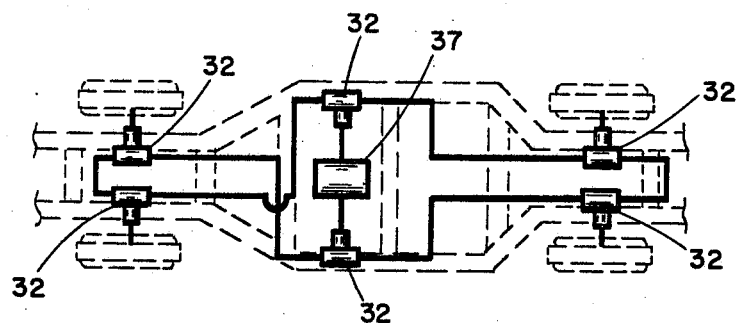
FIG. IX
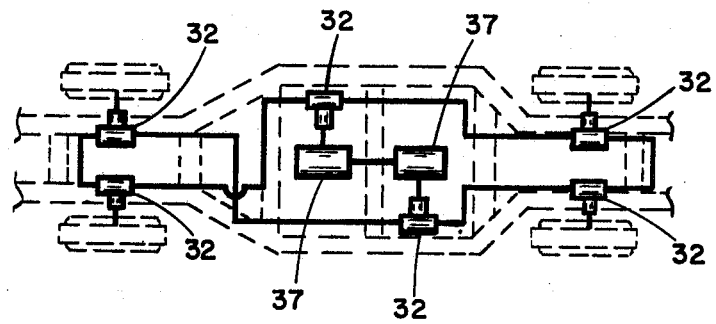
FIG. X
*INVENTOR.*
ROBERT K. GARDNER, SR.
BY
Lawrence H. Poston
AGENT

Dec. 2, 1969   R. K. GARDNER, SR   3,481,358
FAIL-SAFE VALVE SYSTEM
Filed April 14, 1967   5 Sheets-Sheet 4
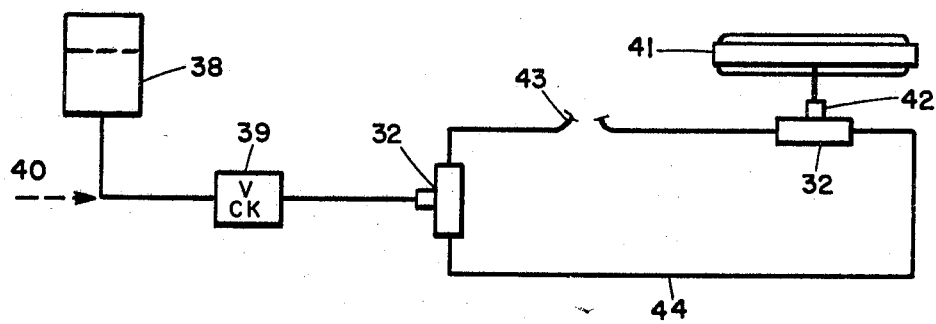
FIG. XI
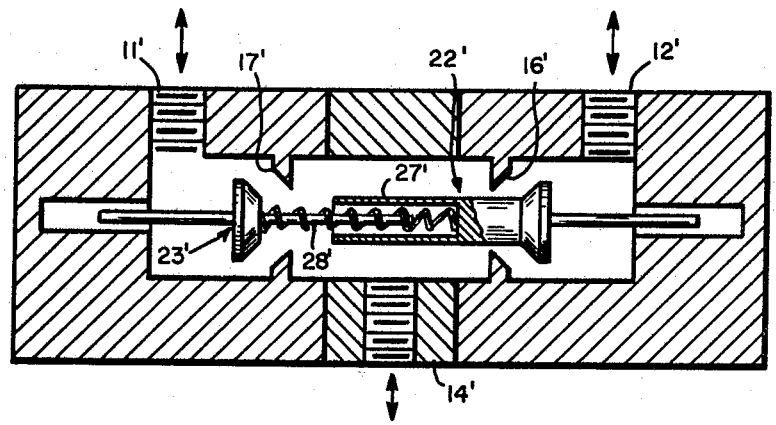
FIG. XII
INVENTOR.
ROBERT K. GARDNER, SR.
BY
Lawrence H. Preton
AGENT Dec. 2, 1969    R. K. GARDNER, SR    3,481,358
FAIL-SAFE VALVE SYSTEM
Filed April 14, 1967    5 Sheets-Sheet 5
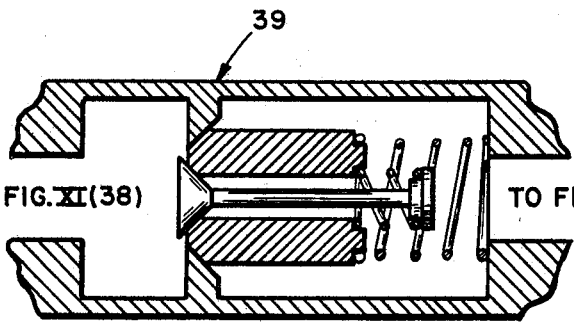
FIG. XIII ←TO FIG.XI(38)    TO FIG.XI(32)
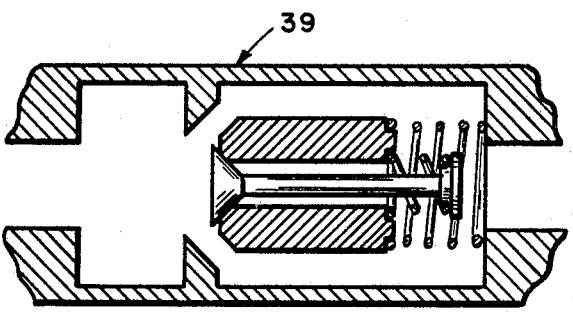
FIG. XIV
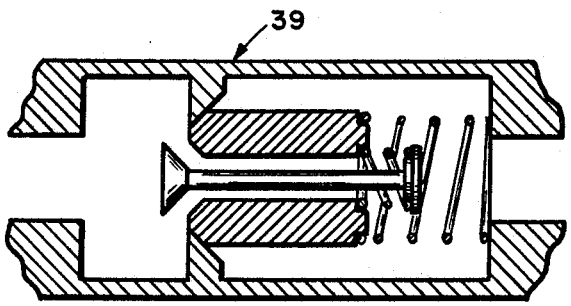
FIG. XV
INVENTOR.
ROBERT K GARDNER, SR.
BY
Lawrence H. Poston
AGENT United States Patent Office 3,481,358
Patented Dec. 2, 1969

3,481,358
FAIL-SAFE VALVE SYSTEM
Robert K. Gardner, Sr., 452 Arnold St.,
New Bedford, Mass. 02740
Filed Apr. 14, 1967, Ser. No. 630,884
Int. Cl. G05d *11/02;* F16k *17/20*
U.S. Cl. 137—118                                     10 Claims

ABSTRACT OF THE DISCLOSURE

A valve system with a single input simultaneously to two fluid lines, a balanced, mutually operatively related double valve system is used to automatically shut off either or both of the fluid lines when either or both are ruptured.

---

This invention relates to fluid systems, and has particular reference to fail-safe means in said systems.

Fluid systems are very widely used in both stationary and mobile equipment and vehicles. In many cases the proper operation of fluid systems is relied upon in very expensive and dangerous situations where failure often results in great financial loss, and more importantly, in loss of life, sometimes many lives.

Perhaps the most dramatic and shocking fluid system failures occur in aircraft. The loss of military aircraft is unfortunate to say the least, with loss of military life more deplorable because of the highly trained nature of the personnel involved, and the money loss of the highly sophisticated air machines is great.

The shock is indeed intense when a large commercial aircraft and its many passengers are destroyed because of failure of a fluid system to a propellor, to landing gear, to a control surface such as an elevator airfoil, or other critical structure.

Less shocking individually, but together worse, and worse than war losses, are the highway fatalities and automobile wrecks which we have for so many years taken for granted.

Many aircraft and automobile losses are documentable and traceable directly to fluid system failure, too often as a result of a simple rupture of a single fluid line such as a control lead to a wheel brake in an automobile.

Stationary equipment often relies on the proper operation of lubricating systems. Highly expensive machines, machine tools for example, can be ruined by lack of oil, even for a short time. Oil spewed about from a broken line can be damaging to nearby goods or create costly clean-up and oil loss conditions.

Chemical systems, in the laboratory as well as in industrial operations, can be dangerous and costly when a fluid system fails.

From these few examples, it is clear that there are many other such situations and that protective means are highly desirable and necessary.

In chemical situations, for further example, this invention is particularly applicable to inter-laboratory plastic flow lines carrying chemicals and special dyes; to flow lines especially provided for carrying nitrogen, hydrogen, oxygen, argon, and the like; to liquid ammonia lines in industrial areas; to lines to experimental vacuum chambers, and to dye vats and lines. These are only a few examples to indicate the very wide applicability of this invention in the chemical field.

In many marine situations, from small power craft to submarines and the largest liners, the fail-safe function uniquely provided by this invention can prevent costly losses in lives and equipment.

Automated equipment of all kinds, stationary and mobile, where fluid devices or lines are used, are especially harmed by fluid line failure, since such equipment either harmfully keeps on going, or shuts down with consequent production loss and costly start-ups.

The really startling fact is that in so many of these situations, fluid systems are used which rely on single line fluid delivery as control lines, especially when rupture of such lines is common from many different causes.

This invention provides a novel and useful fail-safe fluid system in a simple and inexpensive manner, whereby the tragedy and financial losses exemplified hereinbefore are obviated. With this invention, when a fluid line is ruptured, the fluid is instantly shut-off from the ruptured line, while full service is maintained through a companion line.

This invention has the particular advantage that it is a floating valve function during normal operation. The valves, while co-operating in mutual assembly and guidance, are independently floated in open condition, balanced between a common pressure situation in one direction, and individual pressure situations in the other direction.

Thus, from this floating condition, instant individual fail-safe action results upon pressure failure, as by line rupture for example.

Other objects and advantages of this invention will be in part apparent and in part pointed out hereinafter in the accompanying drawings. The various examples presented herein are intended as illustrative and indicative of the scope and spirit of the invention, and are not set forth in limiting sense.

In the drawings:

FIGURE I is an illustrative example of valving means in a fail-safe system according to this invention;

FIGURE II is an enlarged and expanded view of the central valve unit of FIGURE I;

FIGURES III through VI illustrate various conditions of a fail-safe system according to this invention;

FIGURE VII illustrates the application of this invention to an aircraft;

FIGURES VIII through X illustrate various applications of this invention to automobile brakes;

FIGURE XI is an automobile braking system using this invention, with check valve means for maintaining minimum pressure;

FIGURE XII is valve means for applying this invention to a vacuum system; and

FIGURES XIII through XV illustrate different operating positions of the check valve of FIGURE XI.

In FIGURE I, the valve means comprises a main housing 10, end housings 11 and 12, and a central valve assembly 13. The main housing 10 has an input passage boss 14 for receiving fluid pressure from a power source such as a pressurized liquid or gas supply (not shown). The input boss 14 shown is externally threaded for suitable coupling with the power source. The main housing 10 has a transverse passage 15 therethrough, at right angles to the input passage in the boss 14. The end housings 11 and 12 are threadedly mounted on the respective ends of the main housing 10, in continuance of the transverse passage 15. The outer ends of the end housings 11 and 12 are internally threaded to provid mounting means for suitable pipe lines. These could be machined or compression fittings.

Further, in FIGURE I, the transverse passage 15 includes valve seats at 16 and 17, as provided in and by the inner ends of the end housings 11 and 12 respectively. Within the end housings 11 and 12 the passage 15 is reduced in size as at 18 and 19 respectively, providing a step shoulder in each of the end housings. Valve coil springs 20 and 21 have their outer ends based on the step shoulders 18 and 19.

The central valve assembly 13 is made up of two valve units 22 and 23 as indicated in FIGURE II. Valve unit 22 comprises a seatable valve body 24, an outward stem 25, an outward end boss 26 engaging the inner end of spring 20, and an inward stem 27 in the form of a sleeve.

Valve unit 23 comprises a solid inward stem 28 slidably mounted in the sleeve 27 to provide mutual assembly and guiding functions between the valve units 22 and 23. The valve unit 23 also has a seatable valve body 29 and an outer stem 30, with an outer end boss 31 for engaging the inner end of the spring 21.

Accordingly, the valve units 22 and 23 are telescoped together by the springs 20 and 21. The seatable valve bodies 24 and 29 are respectively related to the valve seats 16 and 17.

When an input pressure is applied through the input boss 14, and the end housings 11 and 12 are connected to back pressure lines or systems, the valve bodies 24 and 29 are balanced in pressure floating open valve condition.

On an oppositely equal, balancing force basis, each of the valve bodies 24 and 29 are pressure floated in open valve condition as a normal situation. In each case, the pressurs against the inner flat face of the valve body is balanced against the pressure against the outer conical face of the valve body plus the effect of the coil spring, 20 or 21.

Accordingly, this device provides a normally open, floating valve condition in an operational pressurized situation. When a downstream pressure reduction occurs, as in a line rupture, the pertinent valve body 24 or 29, is slammed shut by the upstream pressure, while the other valve body remains open, thus maintaining its fluid system operationally unchanged.

The series of fluid fail-safe systems of FIGURES III through VI illustrate the use of two units such as the one shown in FIGURE I with suitable coupling lines.

In these illustrations, and others hereinafter, the overall device of FIGURE I will be referred to as valve assembly 32.

Each of the FIGURES III through VI illustrations shows a power source 33. This may be an automobile brake system master cylinder, or any suitable pressurized fluid unit.

Each of the FIGURES III through VI illustrations also shows a load, as at 34. This may be any fluid operated device, such as the brake cylinder in an automobile system. The load 34 may be dead-ended, or it may have a continuous reduced outlet as indicated by dotted lines 35. Such an outlet may be a nozzle on an oil lubricating line. Note however, that sufficient back pressure is maintained to keep the valve assemblies 32 in their open-valve pressure balanced operating condition.

FIGURE III, the situation is normal, all valves are open. FIGURE IV, the top fluid line is ruptured, and closed off by the closure sealing of the top valves. FIGURE V, the same for the bottom line and valves. In FIGURES IV and V the system remains operative through the remaining, unruptured fluid line. FIGURE VI, both lines are ruptured, and all valves are closed. In the FIGURE VI unlikely situation, although the system is inoperative the fail-safe function prevents loss or damage due to loss of fluid.

In FIGURE VII, an aircraft is illustrated with indications of some of the locations and operations possible with the application of the FIGURE III system of this invention. Item 36 is indicated as a common power source (connections not shown) for all of these aircraft systems. As desired, however, each system may have its own individual power source.

FIGURES VIII through X illustrate various automobile braking system applications of this invention. The valve assembly according to FIGURE I is indicated by the numeral 32, in each case.

FIGURE VIII shows a single master cylinder 37 and separate systems for front and rear wheels. Thus rupture of a front system line leaves the rear wheel system unimpaired and operative.

FIGURE IX provides separate systems to each wheel with a single master cylinder 37. Thus rupture of any one line leaves all individual wheel braking systems operative and unimpaired.

FIGURE X provides the individual wheel systems of FIGURE IX, and illustrates how a system can be set up to maintain both front and rear brakes upon rupture of any one line. In this instance two master cylinders 37 are used.

Many variants of the applications of FIGURES VIII through X may be provided without departing from the spirit or scope of this invention.

FIGURE XI illustrates a special system for an automobile wheel brake. It is provided with a gravity feed master cylinder 38. A fluid line leads from the master 38 through a double check valve 39 (FIGURES XIII through XV) to a valve assembly 32 (as the overall of FIGURE I). Operating force is applied through a brake pedal as indicated by arrow 40.

A pair of fluid lines 44 leads to another valve assembly 32 at a wheel 41. Braking pressure, as in FIGURES VIII through X, is applied to the wheel braking cylinder (not shown) through the central access, here at 42, of the wheel valve assembly 32.

When one fluid line is ruptured as at 43, the other fluid line 44 remains operative while the ends of the valve assemblies 32 which lead to the rupture 43, are automatically closed, as discussed with respect to FIGURE I.

In the FIGURE XI situation, when the foot pedal force 40 is released, a minimum pressure is maintained in the system by the check valve 39. Its purpose is to maintain operating pressure in the valve assemblies 32.

FIGURES XIII through XV illustrate the check valve 39 of FIGURE XI, in different stages of operation. FIGURE XIII is the normal operating situation, with the check valve closed in both directions. A minimum pressure is thus held in the system to the right of FIGURE XIII.

FIGURE XIV is the full braking power situation. Thus when the brake pedal is pressed, brake operating pressure is applied from the left of the FIGURE XIV check valve 39, and this valve is fully opened.

FIGURE XV illustrates the situation when the brake pedal is first released. The main portion of the check valve is released and moved from right to left into its seated and closed position as shown, by the back pressure from the system to the right of the valve 39. At the moment shown in FIGURE XV, this back pressure is still larger than the brake system minimum and thus the inner small check valve is opened. As soon as the system pressure reaches the minimum, the valve again assumes the fully closed situation of FIGURE XIII. This double check valve is particularly useful in braking systems of the gravity feed master cylinder type.

FIGURE XII is the same as FIGURE I except that the valving is reversed for use in a vacuum system. Like reference numbers, primed, are used on essentially like elements in FIGURE XII, as are used in FIGURE I.

This invention therefore provides a uniquely new and useful fail-safe system for use in fluid systems and is particularly applicable to the important savings of life and equipment which is expensive in itself, or expensive when harmed.

I claim:

1. A fail-safe valve system wherein an input fluid pressure condition is applied through the system to a pair of output passages for application to pressure lines, with a valve assembly spring-floated in said system for operation by said input pressure condition to close off both said output passages in the event of rupture of both of said pressure lines, said system comprising a central housing, a T passage in said housing with an input passage as the support leg of said T passage, and a valve assembly passage as the top cross of said T passage, an output coupling on each end of said housing at the ends of said top cross of said T passage with a passage therethrough in continuance of said valve assembly passage and the top cross of said T passage, each of said output coupling passages comprising an inwardly facing conical valve seat at the inner ends of said couplings, a reduced diameter portion in each of said coupling passages from said valve seats to points essentially midway of the lengths of said couplings, a portion of each of said coupling passages of further reduced diameter and short length, extending outwardly from said midpoints of said couplings and providing a shoulder in each of said couplings facing inwardly lengthwise thereof at the junction of said reduced diameter portions, said coupling passages thereafter being expanded in diameter at their outside ends, for joining with said pressure lines, said valve assembly comprising a pair of telescoped valve bodies and a coil spring at each outer end of said assembly, placed between said assembly end and the output coupling shoulder respective thereto, one of said valve bodies comprising a conical valve seat portion for valve closing engagement with said conical valve seal in the output coupling at one end of said housing, said one of said valve bodies further comprising an inwardly extending hollow shaft from one side of said valve seat portion as a telescope sleeve, an outwardly extending shaft from the other side of said valve seat portion, and a boss on the outer end of said outwardly extending shaft, said boss having an outer end face for seating the inner end of said assembly spring respective to it, and an inwardly facing shoulder providing a pressure face in aid of the action of closing said one of said valve bodies with respect to its respective valve seat, the other of said valve bodies comprising a like conical valve seat portion for valve closing engagement with said conical valve seat in the output coupling at the other end of said housing, said other of said valve bodies further comprising an inwardly extending shaft from one side of said other valve seat portion as a co-operating shaft in said telescope sleeve of said one of said valve bodies, for relative telescoping movement therein as one or both of said valve bodies is moved with respect to its respective valve seat, and an outwardly extending shaft and end boss in like form and purpose to the comparable structure in said one of said valve bodies, said valve assembly being supported in said valve assembly passage by mutual abutment under the force of said end springs thereagainst, with significant fluid passage space about said assembly, said end springs being outward of said assembly with respect to said valve seats, such that free pressure access is provided each valve seating body and its associated shaft end boss, said valve bodies each being movable without end restriction by the other valve body, and each therefore being independently closable whether the other valve is closed or not, and said reduced diameter coupling passage being of sufficient length to accommodate said end springs, and said outwardly extending valve body shafts and end bosses, without interference to the closing of said valves, whereby both valves may be closed at the same time upon rupture of both of their associated fluid lines simultaneously or at different times.

2. A valve system according to claim 1 wherein said system is fluid powered into a closed system under normal conditions.

3. A valve system according to claim 1 wherein said system is fluid powered into a dynamic continuously flowing system with sufficient normal back pressure to maintain said valves in open condition.

4. A valve system according to claim 1 wherein said valve assembly is reversed and said system is a vacuum system.

5. A valve system according to claim 1 as applied to an aircraft control and comprising a fluid power source, a first double valve at said source, fluid power operating output means, a second double valve at said output means, with a fluid line from one side of said first double valve to one side of said second double valve, and a fluid line from the other side of said first double valve to the other side of said second double valve.

6. A valve system according to claim 1 as applied to a motor operated vehicle of the nature of an automobile and a boat.

7. A valve system according to claim 1 as applied to a chemical process operation.

8. A valve system according to claim 1 as applied to a machine operation.

9. A fail-safe valve system according to claim 1 comprising a fluid power source, a single fluid output line from said source, a check valve in said output line, a first double valve at the end of said output line, a pair of fluid operating lines from said first double valve, a second double valve as the terminus of said fluid operating lines, and an operating output from said second double valve.

10. A valve system according to claim 9 wherein said power source is an automobile brake system master cylinder, and said operating output is applied to the brake of an automobile wheel, whereby minimum operation input power in maintained by said check valve.

References Cited
UNITED STATES PATENTS

| 1,486,617 | 3/1924 | Teegardin | 137—118 X |
| 1,588,657 | 6/1926 | Christensen | 137—118 X |
| 3,198,203 | 8/1965 | Margida | 137—118 |

NATHAN L. MINTZ, Primary Examiner